US010606262B2

(12) United States Patent
Schmid

(10) Patent No.: US 10,606,262 B2
(45) Date of Patent: Mar. 31, 2020

(54) METHOD FOR MONITORING AUTOMATED DRIVING

(71) Applicant: Continental Automotive GmbH, Hannover (DE)

(72) Inventor: Bernhard Schmid, Friedberg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/326,413

(22) PCT Filed: Jul. 16, 2015

(86) PCT No.: PCT/EP2015/066347
§ 371 (c)(1),
(2) Date: Jan. 13, 2017

(87) PCT Pub. No.: WO2016/009012
PCT Pub. Date: Jan. 21, 2016

(65) Prior Publication Data
US 2017/0212512 A1    Jul. 27, 2017

(30) Foreign Application Priority Data
Jul. 17, 2014   (DE) ........................ 10 2014 213 959

(51) Int. Cl.
*G05D 1/00*          (2006.01)
*B60W 50/08*       (2012.01)
(Continued)

(52) U.S. Cl.
CPC ........... *G05D 1/0061* (2013.01); *B60K 28/02* (2013.01); *B60K 28/10* (2013.01); *B60W 50/08* (2013.01);
(Continued)

(58) Field of Classification Search
CPC . G05D 1/0061; G05D 1/0088; B60W 50/082; B60W 50/087; B60W 50/10
See application file for complete search history.

(56) References Cited

U.S. PATENT DOCUMENTS 4,361,202 A * 11/1982 Minovitch ......... B60K 31/0008
                                                                104/88.02
5,469,356 A * 11/1995 Hawkins ................ G01C 21/26
                                                                318/591
(Continued)

FOREIGN PATENT DOCUMENTS

CN        103818380 A      5/2014
DE        19648943 A1      6/1997
(Continued)

OTHER PUBLICATIONS

International Search Report and Written Opinion dated Oct. 21, 2015 from corresponding International Patent Application No. PCT/EP2015/066347.
(Continued)

*Primary Examiner* — Behrang Badii
*Assistant Examiner* — Daniel L Greene

(57) ABSTRACT

On the basis of a sensed driving situation of a vehicle which will occur in the future, it is determined whether a driving assistance system is able to control the vehicle in the automated driving mode in the future driving situation. If it is determined that an automated driving mode is not possible in the future driving situation, and a time (Ts) up to the occurrence of the future driving situation is longer than a time (Tu) necessary for the driver to assume control of the vehicle, it is checked whether the manual control processes sensed by sensors of the vehicle correspond, in the current driving situation, to the automated control processes, determined by the driving assistance system, for the current driving situation. In this case, the assumption of control of (Continued)

Figure 1:
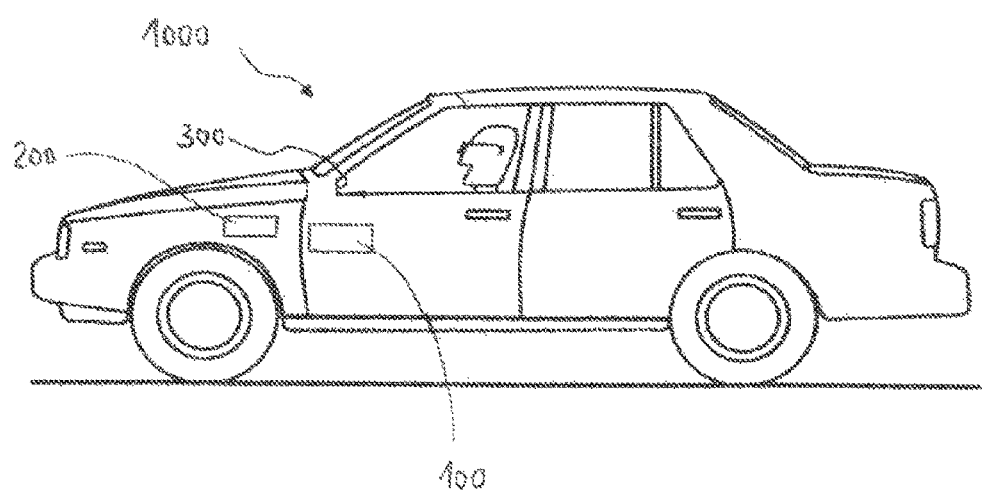

the vehicle by the driver is confirmed, and the vehicle continues to be controlled in the manual driving mode.

17 Claims, 2 Drawing Sheets

(51) Int. Cl.
  *B60W 50/10* (2012.01)
  *B60K 28/02* (2006.01)
  *B60K 28/10* (2006.01)
(52) U.S. Cl.
  CPC ........ *B60W 50/082* (2013.01); *B60W 50/087* (2013.01); *B60W 50/10* (2013.01); *G05D 1/0088* (2013.01); *B60W 2540/04* (2013.01); *B60W 2540/10* (2013.01); *B60W 2540/12* (2013.01); *B60W 2540/18* (2013.01); *G05D 2201/0213* (2013.01)

(56) References Cited

U.S. PATENT DOCUMENTS

| | | | | |
|---|---|---|---|---|
| 6,130,626 | A * | 10/2000 | Kane | G08G 1/0104 235/384 |
| 6,254,202 | B1 * | 7/2001 | Kawamoto | B60T 7/22 303/116.2 |
| 8,078,349 | B1 * | 12/2011 | Prada Gomez | G05D 1/0061 701/1 |
| 9,193,302 | B2 * | 11/2015 | Schofield | B60C 23/0401 |
| 2011/0022393 | A1 * | 1/2011 | Waller | G01C 21/3608 704/270 |
| 2013/0125778 | A1 * | 5/2013 | LaCabe | B61B 13/00 104/130.01 |
| 2014/0022070 | A1 * | 1/2014 | Golomb | B60Q 1/0082 340/475 |
| 2014/0350818 | A1 * | 11/2014 | Obermuller | B60T 8/172 701/74 |
| 2015/0006014 | A1 * | 1/2015 | Wimmer | B60K 26/021 701/23 |
| 2015/0012166 | A1 * | 1/2015 | Hauler | G05D 1/0212 701/23 |
| 2015/0032321 | A1 * | 1/2015 | Wimmer | B60W 50/082 701/23 |
| 2015/0134178 | A1 * | 5/2015 | Minoiu-Enache | B60W 50/035 701/23 |
| 2017/0212512 | A1 * | 7/2017 | Schmid | G05D 1/0061 |

FOREIGN PATENT DOCUMENTS

| | | |
|---|---|---|
| DE | 19743024 A1 | 4/1999 |
| DE | 112006002892 T5 | 11/2008 |
| DE | 102009050399 A1 | 5/2011 |
| DE | 102010031672 A1 | 1/2012 |
| DE | 102011122566 A1 | 6/2013 |
| DE | 102013225759 A1 | 6/2014 |
| DE | 102013216263 A1 | 2/2015 |
| DE | 102013219887 A1 | 4/2015 |
| EP | 0913802 A2 | 5/1999 |
| EP | 2314490 A1 | 4/2011 |
| JP | H03282713 A | 12/1991 |
| JP | H09161196 A | 6/1997 |
| JP | 2003015742 A | 1/2003 |
| JP | 2013043475 A | 3/2013 |
| JP | 2014106854 A | 6/2014 |
| JP | 2015518447 A | 7/2015 |
| WO | 2007050407 A1 | 10/2006 |

OTHER PUBLICATIONS

Search Report dated Jul. 16, 2015 from corresponding DE patent application No. 102014213959.7.
English Translation of Abstract of JP H09161196 A.
English Translation of Abstract of JP 2003015742 A.
Chinese Office Action dated Jun. 13, 2018 for corresponding Chinese Patent Application No. 201580038892.7.

* cited by examiner

METHOD FOR MONITORING AUTOMATED DRIVING

The invention relates to a method for monitoring automated driving, in particular the monitoring of the capability of a driving assistance system to control a vehicle in an automated driving mode.

The introduction of partially automated or highly automated driving functions requires, according to their definition, an assumption of control over driving by the driver. The assumption of the control over the vehicle by the driver has to take place, for example, when a driving assistance system which can control the vehicle in the automated driving mode detects a driving situation which the driving assistance system cannot cope with, or if the automated driving function is degraded, or fails completely, as a result of technical problems of the driving assistance system. In the case of the assumption of control of the vehicle by the driver being requested, the driving assistance system must ensure that the assumption of control by the driver has actually taken place.

In a less complex driving assistance system for assisting a driver, in which the driver also has to assume control of driving independently in critical situations, the determination of simple indices, for example of a movement of the steering wheel, an actuation of the pedals for braking or accelerating, is already sufficient to detect that the driver has assumed control over the vehicle again, since the driver must always necessarily be involved in the driving process. However, in the case of partially or highly automated driving, it is permitted for the driver to withdraw from the driving process during the automated driving and to be occupied with some other activity.

In the case of partially automated or highly automated driving, the abovementioned simple indices are therefore no longer sufficient for determining the actual assumption of control of the vehicle by the driver. It cannot be ruled out that movements of the steering wheel, of the brake pedal or of the accelerator pedal have not been carried out intentionally by the driver but rather have taken place as a result of randomly undesired contact with the steering wheel or the pedals by the driver, even if the driver is not yet able to assume control of the vehicle again. A driver who is, for example, in the process of talking with a passenger at the rear of the vehicle can, when turning toward the passenger, unintentionally bring about steering lock, but this must not be misinterpreted by the driver assistance system as an assumption of control of the vehicle by the driver.

The object of the present invention is to specify a method for monitoring automated driving in which detection of the assumption of control of the vehicle by the driver is ensured during automated driving. A further object of the present invention is to specify a driving assistance system for automated driving with monitoring of the automated driving, which monitoring ensures that the control over the vehicle by a driver during automated driving is detected. A further object of the present invention is to specify a method having such a driving assistance system.

The object with respect to the method for monitoring automated driving is achieved with the method specified in patent claim 1.

According to one possible embodiment of the method for monitoring automated driving, in order to carry out the method a vehicle is made available which can be controlled by automated control processes by means of a driving assistance system in an automated driving mode without a driver.

Furthermore, the vehicle which is made available can be controlled by means of the driving assistance system in an automated emergency operating mode in which the automated driving mode is ended and the vehicle is stopped. Furthermore, the vehicle which is made available can be controlled in a manual driving mode by manual control processes of the driver. The vehicle which is made available is, furthermore, distinguished by the fact that for a changeover between the automated driving mode and the manual driving mode a time is necessary for control of the vehicle to be assumed by the driver.

According to one embodiment of the method, firstly a driving situation which will occur in the future is detected. Subsequently, it is determined whether the driving assistance system is able to control the vehicle in the automated driving mode in the future driving situation. A time which passes from the determination of the future driving situation until the future driving situation will occur is compared with the time for the assumption of control of the vehicle, if it has been previously determined that the driving assistance system is not able to control the vehicle in the automated driving mode in the future driving situation.

It is subsequently checked whether the manual control processes detected by sensors of the vehicle correspond in the current driving situation to the automated control processes determined for the current driving situation by the driving assistance system if it has previously been determined that the time until the future driving situation will occur is longer than the time for the assumption of control of the vehicle by the driver.

The automated driving mode is deactivated and the vehicle is controlled in the manual driving mode if it has been determined that the manual control processes correspond in the current driving situation to the automated control processes determined for the current driving situation by the driving assistance system. If it is determined, however, that the time until the future driving situation will occur is shorter than or equal to the time for the assumption of control of the vehicle, the automated emergency operating mode of the vehicle is activated.

During the automated driving, the steering wheel is decoupled from the steering system, the brake pedal is decoupled from the brake and the accelerator pedal is decoupled from the engine controller. The steering, braking and accelerating induced by the driver can be measured by suitable sensors, for example steering angle sensors and pedal travel sensors. A changeover from the automated driving mode into the manual driving mode is offered to a driver by the driving assistance system when it has been determined by the driving assistance system that the driving assistance system is not able to continue controlling the vehicle in the automated driving mode in a driving situation which will occur in the future, and if the time until the critical driving situation will occur is longer than the necessary time for control of the vehicle to be assumed by the driver.

In order to ensure that the driver has also actually completely assumed control of the vehicle, during the transfer time the steering behavior, braking behavior and acceleration behavior of the vehicle can be detected by means of the vehicle sensors and compared with the calculated setpoint values, which are made available from the automation function by the driving assistance system. If the control processes which are carried out manually correspond to the setpoint values which have been calculated by the driving assistance system for the automated driving, the readiness to assume control by the driver is thereby confirmed and the sensor signals can be transferred directly to the means of actuating the respective actuators for the steering, the brakes and the engine. The automated driving mode can be switched off.

If confirmation of the assumption of control of the vehicle by the driver cannot be determined during the predefined assumption time, since the detected manual control processes do not correspond to the determined necessary automated control processes, the automated driving mode cannot be readily switched off. Instead, the driving assistance system switches the automated function into an emergency operating mode. In the emergency operating mode, depending on the traffic situation, the driving assistance system can either slow down the vehicle to a standstill or the vehicle continues to be controlled in the automated driving mode to the nearest safe location and is stopped there.

As long as the automation function of the driving assistance system is still functionally capable, the interpretation of the driving situation which will occur in the future can also continue to be carried out during the emergency operating mode, and the driving behavior of the driver can continue to be monitored during the emergency operating mode by comparing the automated control processes with potential manual control processes of the driver. If it is determined by the driving assistance system that a driving situation lying ahead can still be coped with by the driving assistance system, the automated driving mode can be continued.

If it is determined during the emergency operating mode that the manual control processes correspond to the calculated setpoint values of the automated control processes, the emergency operating mode can be aborted and the manual driving mode can be changed into.

According to a further embodiment of the method it is possible to check whether there is a defect in the driving assistance system and therefore the automation function is no longer functionally capable, for example as a result of a hardware defect of the system. In this case, the vehicle can be adjusted immediately into the automated emergency operating mode. The emergency operating mode is not ended, and the vehicle controlled in the manual driving mode, until the driver confirms the assumption of control of the vehicle by inputting an external control command, for example by pressing a pushbutton key or by means of a voice input.

Figure 2:
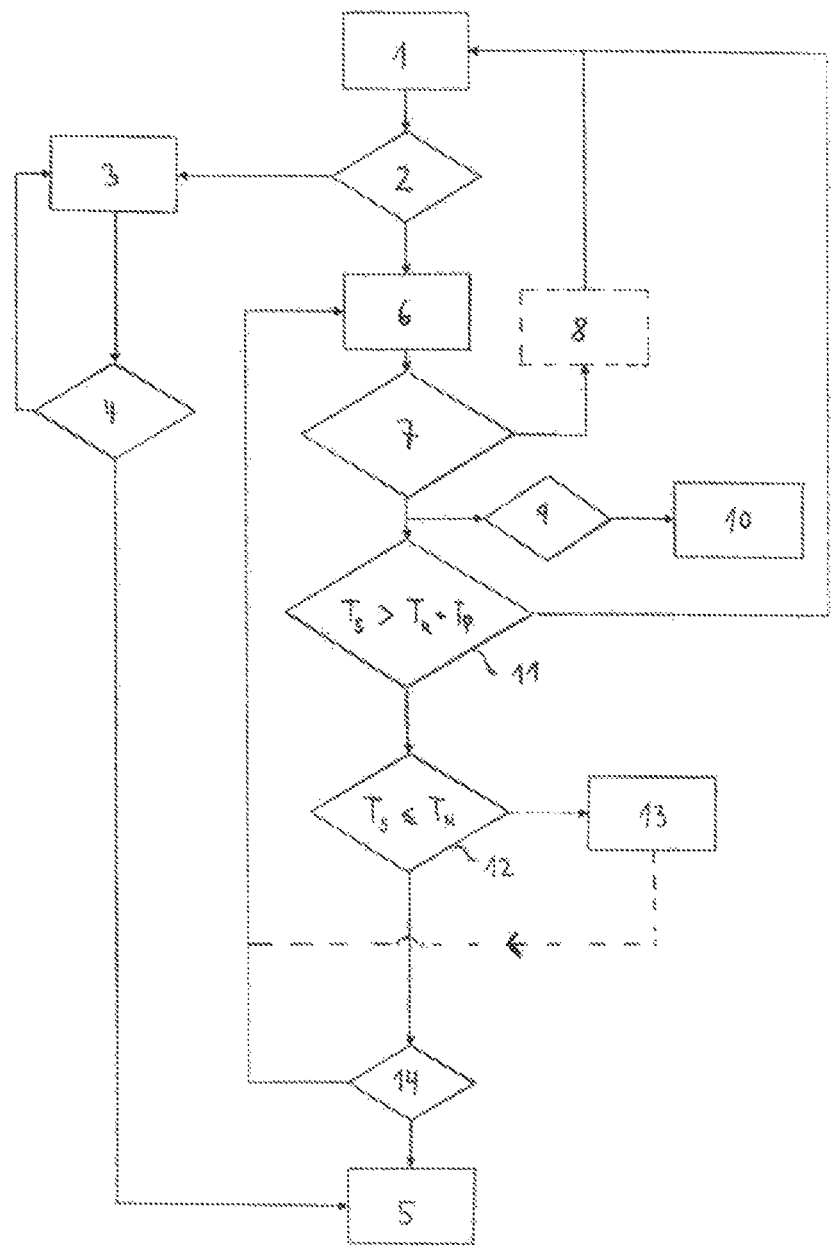

The invention will be explained in more detail below with reference to figures which show exemplary embodiments of the present invention. In the drawing:

FIG. 1 shows a vehicle having a driving assistance system for automated driving with monitoring of the automated driving, and FIG. 2 shows an embodiment of a method for monitoring automated driving.

During the partially automated or highly automated driving it will become necessary for a driver to assume the control over a vehicle again if a critical driving situation occurs which can no longer be coped with by a driving assistance system for automated driving. In such a critical situation, the driver can, however, often not make a correct decision and actively confirm his driving readiness for the assumption of control of the vehicle by pressing a button or by means of a voice input. Cases may also occur in which although a driver has confirmed the assumption of the control of the vehicle, his manual control processes carried out by him give rise to uncontrolled driving behavior owing to him being unable to cope with the sudden assumption request.

By means of the method for monitoring automated driving specified below or by means of a driving assistance system for automated driving with a function for monitoring the automated driving, reliable detection of the driving readiness of the driver is ensured in the background while a vehicle continues to be controlled in an automated fashion. After the assumption of control of the vehicle by the driver, the driver ultimately only then receives the message that the driving assistance system has switched off the automated driving mode.

FIG. 1 shows a vehicle 1000 having a driving assistance system 100 for automated driving. The vehicle has sensors 200 with which manual control processes can be detected. The sensors 200 are, for example, steering angle sensors and pedal travel sensors which can detect movements of the steering wheel, of the brake pedal or of the accelerator pedal. The driving assistance system 100 is designed to control the vehicle by means of automated control processes in an automated driving mode without a driver. Furthermore, the driver assistance system 100 can also control the vehicle in an automated emergency operating mode. When the vehicle 1000 is controlled in the automated emergency operating mode, the automated driving mode is initially continued, but is ended as soon as possible and the vehicle is stopped. Furthermore, the vehicle 1000 can be controlled in a manual driving mode by means of manual control processes of the driver.

According to the method for monitoring the automated driving, a driving situation which lies ahead and in which the vehicle will shortly find itself, that is to say a driving situation which will occur in future, is initially detected. For this purpose, for example a camera system can be used which captures driving events lying ahead or a traffic situation which lies ahead of the vehicle and is evaluated by the driving assistance system 100 in order to detect the driving situation which will occur in the near future. On the basis of the detected driving situation, the driving assistance system 100 can determine whether it is able to continue to control the vehicle 1000 in the automated driving mode in the driving situation which will occur in the future.

If it is determined by the driving assistance system 100 that the driving assistance system is not able to continue to control the vehicle 1000 safely in the automated driving mode in the driving situation lying ahead, a time $T_S$, which indicates a time period between the detection of the driving situation lying ahead until the driving situation lying ahead actually occurs, is compared with a time $T_U$ which is necessary for the assumption of control of the vehicle by the driver. If it is detected in this comparison by the driving assistance system 100 that the time $T_S$ until the future driving situation will occur is longer than the time $T_U$ for the assumption of control of the vehicle, it is checked by the driving assistance system 100 whether the manual control processes which are detected by the sensors 200 of the vehicle 1000 correspond in the current driving situation to the automated control processes determined for the current driving situation by the driving assistance system 100.

If it is found here that the manual control processes of the driver correspond in the current driving situation to the automated control processes calculated in advance for the current driving situation by the driving assistance system 100, the automated driving mode of the driving assistance system is deactivated and the vehicle 1000 is operated in the manual driving mode. The driver can then actively assume control over the vehicle. If in the comparison of the time $T_S$ until the driving situation lying ahead occurs with the time $T_U$ which is necessary for the assumption of control of the vehicle by the driver the driving assistance system determines that the time $T_S$ is shorter than or equal to the time $T_U$, the automated emergency operating mode of the vehicle 100 is activated.

In the text which follows, an exemplary embodiment of the method for monitoring automated driving will be described with reference to FIG. 2. In an initial state 1, the vehicle 1000 is initially operated by the driving assistance system 100 in the automated driving mode. In a subsequent step 2, it is checked by the driving assistance system 100 whether the automation function of the driving assistance system, which permits the automated driving, is defective such that the automated driving mode of the vehicle 1000 by means of the driving assistance system 100 is no longer ensured. If a defect of the driving assistance system 100 is determined, in a method step 3 the automated emergency operating mode of the vehicle is activated. The vehicle continues to be controlled in an automated fashion for a short time in the automated emergency operating mode, and is stopped at the next opportunity, for example in a parking place.

According to one possible embodiment, the driving assistance system 100 is coupled to an input device 300 for the external inputting of a control command to change into the manual driving mode. The input device 300 can be, for example, a pushbutton key, with the result that the control command to change into the manual driving mode can be input by pressing a pushbutton key. Furthermore, the input device 300 can be a microphone, with the result that the driving assistance system receives the control command to change into the manual driving mode by means of a voice input.

During the driving in the automated emergency operating mode of the method step 3, it is checked by the driving assistance system 100 in a method step 4 whether the inputting of the control command to change into the manual driving mode has been carried out by the driver. If the driving assistance system 100 determines the inputting of the control command to change into the manual driving mode, the automated emergency operating mode of the vehicle 1000 is deactivated and the vehicle continues to be operated in the manual driving mode in a method step 5. Correspondingly, in the method step 5 the automated emergency operating mode is deactivated.

If it is determined in the method step 2 that the automation function for automated driving is fully functionally capable, in a method step 6 an interpretation of the driving situation lying ahead is carried out by the driving assistance system. In this context, a driving situation or traffic situation which will occur in future is detected. In a subsequent method step 7, the driving assistance system 100 determines whether the driving assistance system is able to continue to control the vehicle 1000 in the automated driving mode in the detected driving situation which will occur in the future. If it is detected that the driving situation lying ahead can continue to be coped with in an automated fashion, a previously possibly set automated emergency operating mode is optionally ended in a method step 8, or the automated driving of the method step 1 is merely continued further if the vehicle is being operated in the automated driving mode.

If it is determined in the method step 7 that the driving assistance system 100 is not able to control the vehicle 1000 in the automated driving mode in the future driving situation, in a method step 9 it is checked whether the automated emergency operating mode is already activated. If the automated emergency operating mode is already activated, this state is retained further. Otherwise, in a method step 10 pre-conditioning of the automated emergency operating mode takes place, which corresponds to switching on a standby state of the activated emergency operating mode. During the pre-conditioning, for example parameters which are required for the automated emergency operating mode are pre-set.

In a method step 11, the time $T_S$ until the future driving situation will occur is compared with a sum of the time $T_U$ for the assumption of control of the vehicle by the driver and an additional buffer time $T_P$ if it has previously been determined that the driving assistance system 100 is not able to control the vehicle 1000 in the automated driving mode in the driving situation which will occur in future. If in this comparison the driving assistance system 100 has determined that the time $T_S$ until the future driving situation will occur is longer than the sum of the time $T_U$ for the assumption of control of the vehicle 1000 and the buffer time $T_P$, the automated driving mode of the initial state 1 is continued. If, on the other hand, it has been determined in the comparison that the time $T_S$ until the future driving situation will occur is shorter than or equal to the sum of the time $T_U$ for the assumption of control of the vehicle and the buffer time $T_P$, in a subsequent method step 12 a comparison of the time $T_S$ until the future driving situation will occur with the time $T_U$ for the assumption of control of the vehicle is carried out by means of the driving assistance system 100.

If in this comparison of the time $T_S$ with the time $T_U$ in the method step 12 the driving assistance system 100 determines that the time $T_S$ until the future driving situation will occur is actually shorter than or equal to the time $T_U$ for the assumption of control of the vehicle 1000 by the driver, in method step 13 the automated emergency operating mode of the vehicle is activated. The vehicle can then be stopped at the next possible opportunity, for example when a parking possibility is reached. Optionally, during the emergency operating mode an interpretation of the driving situation lying ahead as in method step 6 continues to be carried out. If it is then determined in method step 7 that the driving situation lying ahead can still be coped with in an automated fashion again, the initial state 1 of the automated driving is changed to again.

If in the comparison of the time $T_S$ until the future driving situation will occur with the necessary time $T_U$ for the assumption of control of the vehicle by the driver in the method step 12 it is determined that the time $T_S$ is longer than the time $T_U$, in a method step 14 an operation of detecting assumption of control by the driver is carried out. During this operation of detecting the assumption of control of the vehicle by the driver, the manual control processes which are detected by the sensors 200 of the vehicle 1000 in the current driving situation are compared with the automated control processes determined for the current driving situation by the driving assistance system 100.

If it is determined here that the manual control processes in the current driving situation correspond to the automated control processes which have been calculated in advance in this current driving situation by the driving assistance system 100, the further driving of the vehicle is continued with the method step 5. In this context, the automated driving mode is deactivated and the vehicle is controlled in the manual driving mode.

If, in contrast, in the comparison of the method step 14 between the manual control processes and the determined automated control processes for the current driving situation it is determined by the driving assistance system that the setpoint values calculated from the automated driving function do not correspond to the actual manual control processes of the driver, the method step 6 is changed into again. In this case, the driver has not yet certainly assumed control of the vehicle. Therefore, the vehicle initially continues to be controlled in an automated fashion.

If it is determined in the subsequent method step 7 that the driving situation lying ahead can now be coped with in an automated fashion, the pre-conditioning of the activated emergency operating mode, which has previously taken place in the method step 10, is cancelled again in the method step 8 and the vehicle continues to be operated in an automated fashion in the initial state 1.

The invention claimed is:

1. A method of automated driving, comprising:
   making available a vehicle, wherein the vehicle can be controlled by automated control processes by a driving assistance system in an automated driving mode without a driver, wherein the vehicle can be controlled by the driving assistance system in an automated emergency operating mode in which the automated driving mode is ended and the vehicle is stopped, and wherein the vehicle can be controlled in a manual driving mode by manual control processes of the driver, wherein for a changeover between the automated driving mode and the manual driving mode a time ($T_U$) is necessary for control of the vehicle to be assumed by the driver;
   detecting a driving situation which will occur in the future;
   determining whether the driving assistance system is able to control the vehicle in the automated driving mode in the future driving situation;
   comparing a time ($T_S$) until the future driving situation will occur with the time ($T_U$) for the assumption of control of the vehicle in response to the determination that the driving assistance system is not able to control the vehicle in the automated driving mode in the future driving situation;
   checking whether the manual control processes detected by sensors of the vehicle correspond in the current driving situation to the automated control processes determined for the current driving situation by the driving assistance system in response to a determination that the time ($T_S$) until the future driving situation will occur is longer than the time ($T_U$) for the assumption of control of the vehicle by the driver;
   deactivating the automated driving mode and controlling the vehicle in the manual driving mode in response to a determination that the manual control processes correspond in the current driving situation to the automated control processes determined for the current driving situation by the driving assistance system; and
   activating the automated emergency operating mode of the vehicle in response to a determination that the time ($T_S$) until the future driving situation will occur is shorter than or equal to the time ($T_U$) for the assumption of control of the vehicle.

2. The method as claimed in claim 1, comprising:
   detecting the driving situation which will occur in future in response to a determination that the manual control processes in the current driving situation do not correspond to the automated control processes determined for the current driving situation by the driving assistance system.

3. The method as claimed in claim 1, comprising:
   comparing the time ($T_S$) until the future driving situation will occur with a sum of the time ($T_U$) for the assumption of control of the vehicle and a buffer time ($T_P$) in response to a determination that the driving assistance system will not able to control the vehicle in the automated driving mode in the future driving situation, and
   continuing the automated driving mode of the vehicle in response to a determination that the time ($T_S$) until the future driving situation will occur is longer than the sum of the time ($T_U$) for the assumption of control of the vehicle and the buffer time ($T_P$).

4. The method as claimed in claim 3, comprising:
   carrying out the comparison of the time ($T_S$) until the future driving situation will occur with the time ($T_U$) for the assumption of control of the vehicle in response to a determination that the time ($T_S$) until the future driving situation will occur is shorter than or equal to the sum of the time ($T_U$) for the assumption of control of the vehicle and the buffer time ($T_P$).

5. The method as claimed in claim 1, comprising:
   checking whether the activated emergency operating mode of the vehicle is activated in response to a determination that the driving assistance system is not able to control the vehicle in the automated driving mode in the future driving situation, and
   pre-conditioning the activated emergency operating mode in response to a determination that the activated emergency operating mode of the vehicle is deactivated and the driving assistance system is not able to control the vehicle in the automated driving mode in the future driving situation.

6. The method as claimed in claim 5, comprising:
   cancelling the pre-conditioning of the activated emergency operating mode in response to a determination that the driving assistance system is able to control the vehicle in the automated driving mode in the future driving situation.

7. The method as claimed in claim 1, comprising:
   checking whether the driving assistance system is defective in such a way that the automated driving mode of the vehicle by the driving assistance system is impossible, and
   activating the automated emergency operating mode of the vehicle in response to a determination that the driving assistance system is defective.

8. The method as claimed in claim 7, comprising:
   providing an input device for the external inputting of a control command to change into the manual driving mode,
   checking whether the inputting of the control command to change into the manual driving mode has taken place, and
   deactivating the automated emergency operating mode of the vehicle and controlling the vehicle in the manual driving mode in response to the receipt of the control command to change into the manual driving mode.

9. A vehicle configured for automated driving, the vehicle comprising:
   a driving assistance system for automated driving, the driving assistance system being configured to perform operations including:
      providing an automated driving mode wherein the vehicle can be controlled by automated control processes without a driver, an automated emergency operating mode in which the automated driving mode is ended and the vehicle is stopped, and a manual driving mode wherein the vehicle is controlled by manual control processes of the driver, wherein for a changeover from the automated driving mode to the manual driving mode a time ($T_U$) is necessary for control of the vehicle to be assumed by the driver;

detecting a driving situation which will occur in the future;

determining whether the driving assistance system is able to control the vehicle in the automated driving mode in the future driving situation;

comparing a time ($T_S$) until the future driving situation will occur with the time ($T_U$) for the assumption of control of the vehicle in response to a determination that the driving assistance system is not able to control the vehicle in the automated driving mode in the future driving situation;

checking whether the manual control processes detected by sensors of the vehicle correspond in the current driving situation to the automated control processes determined for the current driving situation by the driving assistance system in response to a determination that the time ($T_S$) until the future driving situation will occur is longer than the time ($T_U$) for the assumption of control of the vehicle by the driver;

deactivating the automated driving mode and controlling the vehicle in the manual driving mode in response to a determination that the manual control processes correspond in the current driving situation to the automated control processes determined for the current driving situation by the driving assistance system; and activating the automated emergency operating mode of the vehicle in response to a determination that the time ($T_S$) until the future driving situation will occur is shorter than or equal to the time ($T_U$) for the assumption of control of the vehicle.

10. A driving assistance system for automated driving of a vehicle with monitoring of the automated driving, wherein the driving assistance system is configured to carry out operations comprising:

providing an automated driving mode without a driver, an automated emergency operating mode in which the automated driving mode is ended and the vehicle is stopped, and a manual driving mode in which the vehicle is controlled by manual control processes of the driver, wherein for a changeover from the automated driving mode to the manual driving mode a time ($T_U$) is necessary for control of the vehicle to be assumed by the driver;

detecting a driving situation which will occur in the future;

determining whether the driving assistance system is able to control the vehicle in the automated driving mode in the future driving situation;

comparing a time ($T_S$) until the future driving situation will occur with the time ($T_U$) for the assumption of control of the vehicle in response to a determination that the driving assistance system is not able to control the vehicle in the automated driving mode in the future driving situation;

checking whether the manual control processes detected by sensors of the vehicle correspond in the current driving situation to the automated control processes determined for the current driving situation by the driving assistance system in response to a determination that the time ($T_S$) until the future driving situation will occur is longer than the time ($T_U$) for the assumption of control of the vehicle by the driver;

deactivating the automated driving mode and controlling the vehicle in the manual driving mode in response to a determination that the manual control processes correspond in the current driving situation to the automated control processes determined for the current driving situation by the driving assistance system; and activating the automated emergency operating mode of the vehicle in response to a determination that the time ($T_S$) until the future driving situation will occur is shorter than or equal to the time ($T_U$) for the assumption of control of the vehicle.

11. The driving assistance system as claimed in claim 10, further configured to carry out operations comprising detecting the driving situation which will occur in future in response to a determination that the manual control processes in the current driving situation do not correspond to the automated control processes determined for the current driving situation by the driving assistance system.

12. The driving assistance system as claimed in claim 10, further configured to carry out operations comprising:

comparing the time ($T_S$) until the future driving situation will occur with a sum of the time ($T_U$) for the assumption of control of the vehicle and a buffer time ($T_P$) in response to a determination that the driving assistance system is not able to control the vehicle in the automated driving mode in the future driving situation, and continuing the automated driving mode of the vehicle in response to a determination that the time ($T_S$) until the future driving situation will occur is longer than the sum of the time ($T_U$) for the assumption of control of the vehicle and the buffer time ($T_P$).

13. The driving assistance system as claimed in claim 12, further configured to carry out operations comprising carrying out the comparison of the time ($T_S$) until the future driving situation will occur with the time ($T_U$) for the assumption of control of the vehicle in response to a determination that the time ($T_S$) until the future driving situation will occur is shorter than or equal to the sum of the time ($T_U$) for the assumption of control of the vehicle and the buffer time ($T_P$).

14. The driving assistance system as claimed claim 10, further configured to carry out operations comprising:

checking whether the activated emergency operating mode of the vehicle is activated in response to a determination that the driving assistance system is not able to control the vehicle in the automated driving mode in the future driving situation, and pre-conditioning the activated emergency operating mode in response to a determination that the activated emergency operating mode of the vehicle is deactivated and the driving assistance system is not able to control the vehicle in the automated driving mode in the future driving situation.

15. The driving assistance system as claimed in claim 14, further configured to carry out operations comprising cancelling the pre-conditioning of the activated emergency operating mode in response to a determination that the driving assistance system is able to control the vehicle in the automated driving mode in the future driving situation.

16. The driving assistance system as claimed in claim 10, further configured to carry out operations comprising:

checking whether the driving assistance system is defective in such a way that the automated driving mode of the vehicle by the driving assistance system is impossible, and activating the automated emergency operating mode of the vehicle in response to a determination that the driving assistance system is defective.

17. The driving assistance system as claimed in claim 16, further configured to carry out operations comprising:
making available to the vehicle an input device for the external inputting of a control command to change into the manual driving mode,
checking whether the inputting of the control command to change into the manual driving mode has taken place, and
deactivating the automated emergency operating mode of the vehicle and controlling the vehicle in the manual driving mode in response to the receipt of the control command to change into the manual driving mode.

* * * * *